US011293837B2

(12) United States Patent
Bower

(10) Patent No.: US 11,293,837 B2
(45) Date of Patent: Apr. 5, 2022

(54) METHOD AND SYSTEM FOR MANAGING THE MONITORING OF AN ENGINE COOLING SYSTEM

(71) Applicant: Toyota Motor Engineering & Manufacturing North America, Inc., Plano, TX (US)

(72) Inventor: Laura E. Bower, Whitmore Lake, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 530 days.

(21) Appl. No.: 16/255,410

(22) Filed: Jan. 23, 2019

(65) Prior Publication Data

US 2020/0232882 A1 Jul. 23, 2020

(51) Int. Cl.
*G01M 15/05* (2006.01)
*F01P 11/14* (2006.01)

(52) U.S. Cl.
CPC .............. *G01M 15/05* (2013.01); *F01P 11/14* (2013.01); *F01P 2023/08* (2013.01); *F01P 2025/13* (2013.01); *F01P 2025/34* (2013.01); *F01P 2025/62* (2013.01)

(58) Field of Classification Search
CPC .......... G01M 15/05; F01P 11/14; F01P 11/16; F01P 7/16; F01P 2025/62; F01P 2025/64; F01P 2025/32; F01P 2025/34; F01P 2025/13; F01P 2023/08; F01P 2060/08; F02D 45/00
See application file for complete search history.

(56) References Cited

U.S. PATENT DOCUMENTS

| | | | |
|---|---|---|---|
| 4,487,180 A * | 12/1984 | Ito ........................... | F02D 17/04 123/198 D |
| 6,931,865 B1 | 8/2005 | Van Gilder et al. | |
| 7,325,447 B2 | 2/2008 | Miyahara et al. | |
| 7,921,705 B2 | 4/2011 | Hamama et al. | |
| 8,751,101 B2 | 6/2014 | Weber et al. | |
| 8,770,834 B2 | 7/2014 | Suzuki | |
| 8,791,803 B2 * | 7/2014 | Ishikawa ............. | G01M 15/042 340/438 |
| 9,151,211 B2 | 10/2015 | Anilovich et al. | |
| 9,605,584 B2 | 3/2017 | Nethercutt | |
| 9,719,409 B2 * | 8/2017 | Rollinger .............. | B60W 10/00 |

(Continued)

FOREIGN PATENT DOCUMENTS

DE 102017203815 B3 6/2018
FR 2837525 B1 1/2005

*Primary Examiner* — Grant Moubry
(74) *Attorney, Agent, or Firm* — Haynes and Boone, LLP

(57) ABSTRACT

Methods and systems for managing a monitoring of an engine cooling system. A transient condition associated with an engine system is identified. A determination is made as to whether the transient condition is a delay condition based on whether the transient condition exceeds a transient threshold. A determination is made, in response to a determination that the transient condition is not the delay condition, as to whether a period of time that has passed since a previously identified delay condition meets a time threshold. Monitoring of a health of the engine cooling system is enabled in response to a determination that the period of time meets the time threshold.

20 Claims, 6 Drawing Sheets

(56) References Cited

U.S. PATENT DOCUMENTS

| | | | |
|---|---|---|---|
| 9,790,842 B2 * | 10/2017 | Dudar | F01P 11/18 |
| 10,060,333 B2 * | 8/2018 | Rejeti | F01P 11/16 |
| 10,100,713 B2 * | 10/2018 | Rollinger | F01P 11/04 |
| 2018/0073418 A1 | 3/2018 | Bonkoski et al. | |

* cited by examiner

METHOD AND SYSTEM FOR MANAGING THE MONITORING OF AN ENGINE COOLING SYSTEM

FIELD

The present disclosure generally relates to monitoring a health of an engine system and, more particularly, to methods and systems for managing when to monitor an engine cooling system of the engine system based on an evaluation of the transient condition of the engine system over time.

BACKGROUND

One factor in the overall health of an engine system is the health of its engine cooling system. An engine cooling system circulates coolant through the engine system to help keep the engine system running at a substantially constant temperature. For example, the engine cooling system for a vehicle (e.g., an automotive vehicle) is used to dissipate heat and to allow the engine system to heat up as quickly as possible during operation. Typically, the coolant circulated through the engine system is a liquid, such as water. In other engine systems, the coolant is air. Monitoring the health of an engine cooling system, such as the engine cooling system for an automotive vehicle, includes monitoring the temperature of the coolant. Further, monitoring includes modeling the expected temperature of the coolant over time based on, for example, engine operating conditions and ambient conditions. A health of the engine cooling system is determined based on the modeled temperature and the actual temperature. In some cases, the modeling of the expected temperature for the coolant over time is not accurate due to certain transient effects. Accordingly, the results of monitoring the health of the engine cooling system over time may not be as accurate as desired.

SUMMARY

In one example embodiment, a method for managing a monitoring of an engine cooling system is provided. A transient condition associated with an engine system is identified. A determination is made as to whether the transient condition is a delay condition based on whether the transient condition exceeds a transient threshold. A determination is made, in response to a determination that the transient condition is not the delay condition, as to whether a period of time that has passed since a previously identified delay condition meets a time threshold. Monitoring of a health of the engine cooling system is enabled in response to a determination that the period of time meets the time threshold.

In another example embodiment, a system comprises an engine system that includes an engine cooling system; a sensor system coupled to the engine system; and a health manager in communication with the sensor system. The health manager identifies a transient condition associated with the engine system based on sensor data received from the sensor system. The health manager determines whether the transient condition is a delay condition based on whether the transient condition exceeds a transient threshold. The health manager determines, in response to a determination that the transient condition is not the delay condition, whether a period of time that has passed since a previously identified delay condition meets a time threshold. The health manager enables the monitoring of a health of the engine cooling system in response to a determination that the period of time meets the time threshold.

In one example embodiment, a method for managing a monitoring of an engine cooling system is provided. A transient condition for an engine system is identified for a current point in time. A transient threshold and a time threshold are computed for the current point in time. A determination is made as to whether the transient condition is a delay condition based on whether the transient condition exceeds a transient threshold. A determination is made, in response to a determination that the transient condition is not the delay condition, as to whether a period of time that has passed since a previously identified delay condition meets a time threshold. Monitoring of a health of the engine cooling system is enabled in response to a determination that the period of time meets the time threshold. The monitoring of the health of the engine cooling system is delayed in response to either a determination that the transient condition is the delay condition or a determination that the period of time does not meet the time threshold.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more methods and systems for managing a supply of power to a communications system in a vehicle. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have methods and systems that more efficiently manage how an engine cooling system is monitored. In particular, the embodiments described below provide methods and systems for taking into account the impact of the transient condition associated with an engine system to control when the engine cooling system is monitored. The transient condition for an engine system is the difference between the current condition of the engine system and a previous condition of the engine system. In some cases, this difference is so great that monitoring the health of the engine cooling system during or just after such a transient condition may produce results less accurate than desired. More particularly, such a transient condition may result in inaccurate modeling of the expected coolant temperature.

The example embodiments described below provide methods and systems for taking into account these transient conditions such that monitoring of the health of the engine cooling system is not enabled or performed during or after such transient conditions. In particular, when the difference between the current condition and the previous condition of the engine system is greater than a transient threshold, monitoring of the health of the engine cooling system is delayed. These methods and systems ensure that monitoring of the engine cooling system is performed when the health of the engine cooling system can be accurately determined. By controlling when the monitoring of the engine cooling system is performed based on the extent of the transient condition, modeling of the coolant temperature for the engine cooling system and thereby, monitoring of the health of the engine cooling system, may be more accurately performed.

Figure 1:
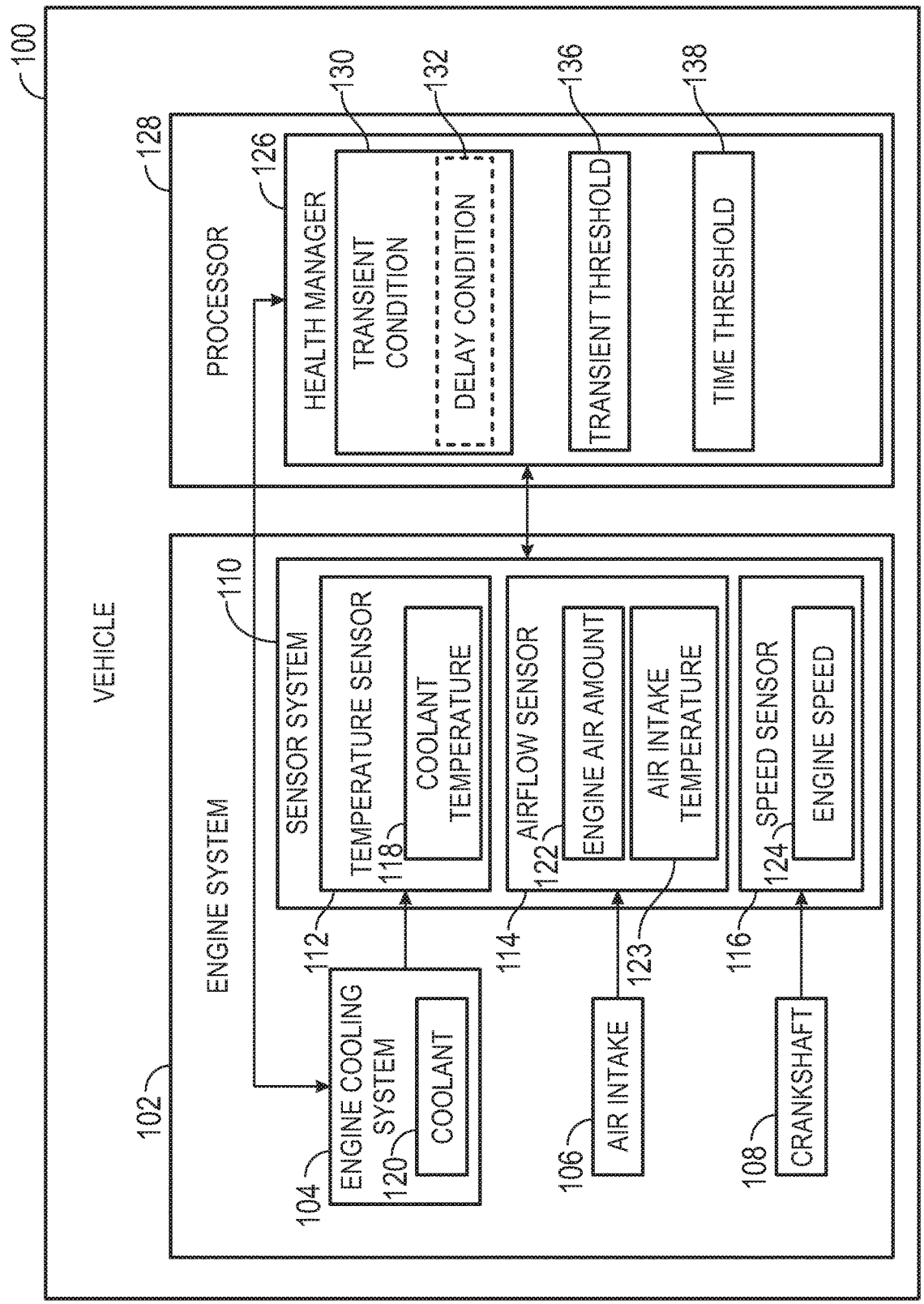
FIG. 1 is a block diagram depicting a vehicle in accordance with an example embodiment.

Referring now to the figures, FIG. 1 is a block diagram depicting a vehicle 100 in accordance with an example embodiment. In one example embodiment, vehicle 100 is an automotive vehicle. Vehicle 100 includes engine system 102. Engine system 102 includes engine cooling system 104, air intake 106, crankshaft 108, and sensor system 110. In these examples, sensor system 110 is part of engine system 102, but in other examples, sensor system 10 may be considered separate from and coupled to engine system 102.

Sensor system 110 includes one or more sensors or sensor devices in communication with each other. In one example embodiment, sensor system 110 includes temperature sensor 112. In some examples, sensor system 110 further includes airflow sensor 114, speed sensor 116, or both. Each of the sensors in sensor system 110 may be comprised of one or more sensors or sensor devices.

Temperature sensor 112 is coupled to engine cooling system 104. Temperature sensor 112 is used to measure coolant temperature 118 of coolant 120 that is circulated through engine system 102 by the engine cooling system 104. Coolant 120 is comprised of one or more fluids. A fluid, as used herein, may be a liquid or a gas. For example, coolant 120 may include water, air, or some other type of coolant.

Airflow sensor 114 is coupled to air intake 106 to measure engine air amount 122. In one or more examples, airflow sensor 114 is also referred to as a mass airflow sensor. In some examples, airflow sensor 114 is also used to measure air intake temperature 123. For example, airflow sensor 114 may include a single sensor capable of measuring engine air amount 122 and air intake temperature 123. Alternatively, airflow sensor 114 may include a sensor for measuring engine air amount 122 and a different sensor for measuring air intake temperature 123. In still other examples, air intake temperature 123 may be measured using some other sensor other than airflow sensor 114. Speed sensor 116 is coupled to crankshaft 108 to measure engine speed 124.

Vehicle 100 also includes health manager 126. Health manager 126 is used to monitor the overall health of engine system 102, the health of one or more components of engine system 102, or both. In one or more example embodiments, health manager 126 is used to monitor the health of engine cooling system 104. In these examples, health manager 126 is in communication with sensor system 110 and uses the data generated by sensor system 110 to monitor the health of engine cooling system 104.

Health manager 126 is implemented using software, hardware, firmware, or a combination thereof. In some examples, health manager 126 is implemented using a single processor or multiple processors in communication with each other. When multiple processors are used, these processors may be in communication with each other through at least one of a wired communications link, a wireless communications link, or some other type of communications link. In some examples, health manager 126 includes various components that are in communication with each other through at least one of wired, wireless, or optical communications links.

In one example embodiment, health manager 126 is implemented using processor 128. Processor 128 may be coupled to, part of, or otherwise associated with engine system 102. In other examples, health manager 126 may be implemented using a cloud that is communicatively coupled to sensor system 110 and engine cooling system 104.

Health manager 126 uses the data provided by sensor system 110 to identify transient condition 130. Transient condition 130 is the difference or deviation between a current condition of engine system 102 at a current point in time and a previous condition of engine system 102 at a previous point in time. The previous point in time may be at a predetermined time interval before the current point in time. In one or more example embodiments, this time interval may be fixed. For example, the predetermined time interval may be 1 second, 5 seconds, 30 seconds, 1 minute, 5 minutes, 10 minutes, 30 minutes, or some other interval of time before the current point in time.

Health manager 126 controls a monitoring of the health of engine cooling system 104 based on whether transient condition 130 rises to the level of delay condition 132 and based on time threshold 138. Delay condition 132 is a condition that indicates that monitoring the health of engine cooling system 104 may not produce results with the desired level of accuracy and therefore should be delayed. In other words, if transient condition 130 is identified as delay condition 132, monitoring of the health of engine cooling system 104 is delayed.

In one example embodiment, health manager 126 determines whether to identify transient condition 130 as delay condition 132 based on whether transient condition 130 meets or exceeds transient threshold 136. In one example embodiment, if transient condition 130 meets or exceeds transient threshold 136, transient condition 130 is identified as delay condition 132. In other example embodiments, delay condition 132 may be referred to as a pause or deactivate condition that indicates when monitoring of engine cooling system 104 is to be paused or deactivated.

Transient threshold 136 is a dynamic threshold. In other words, transient threshold 136 changes over time. Health manager 126 dynamically computes transient threshold 136 for any given point in time based on sensor data received from the sensor system 110. In one example embodiment, health manager 126 computes transient threshold 136 at the point in time corresponding to transient condition 130 using data generated by sensor system 110. For example, health manager 126 may compute transient threshold 136 based on coolant temperature 118. In some examples, health manager 126 computes transient threshold 136 based on coolant temperature 118 and at least one of engine air amount 122, air intake temperature 123, or engine speed 124.

In some examples, transient threshold 136 is a single threshold to which a magnitude (or absolute value) of transient condition 130 is compared. In other examples, transient threshold 136 includes a positive threshold and a negative threshold. The range of values between the positive and negative thresholds and, in some cases, including these two thresholds, determines the values for which transient condition 130 is not identified as delay condition 132. The range of values outside the positive and negative thresholds, and in some cases, including these two thresholds, determines the values for which transient condition 130 is identified as delay condition 132.

Health manager 126 may also use time threshold 138 to determine when to enable monitoring of the health of engine cooling system 104. For example, when health manager 126 determines that transient condition 130 is not delay condition 132, health manager 126 then determines whether a period of time that has passed since a previously identified delay condition meets time threshold 138.

Time threshold 138 is a dynamic threshold. In other words, time threshold 138 changes over time. Health manager 126 dynamically computes time threshold 138 for any given point in time based on sensor data received from the sensor system 110. In one example embodiment, health manager 126 computes time threshold 138 for the point in time corresponding to transient condition 130 using data generated by sensor system 110. For example, health manager 126 may compute time threshold 138 based on coolant temperature 118, engine air amount 122, air intake temperature 123, engine speed 124, or a combination thereof. In these example embodiments, time threshold 138 is computed to ensure that a sufficient period of time has passed since a previously identified delay condition to thereby ensure that modeling of the expected coolant temperature for engine cooling system 104 has the desired level of accuracy when monitoring of the engine cooling system 104 resumes.

By enabling monitoring of the health of engine cooling system 104 only after a sufficient period of time has passed since the previously identified delay condition, health manager 126 may better ensure accurate results from this monitoring. Further, this type of management of the monitoring of the engine cooling system ensures that modeling of coolant temperature 118 and the overall engine cooling system 104 is more accurate.

The illustration of vehicle 100 in FIG. 1 is not meant to imply physical or architectural limitations to the manner in which an example embodiment may be implemented. Other components in addition to or in place of the ones illustrated may be used. Some components may be optional. Also, some blocks are presented to illustrate functional components. One or more of the blocks in FIG. 1 may be combined, divided, or combined and divided into different blocks when implemented in an example embodiment.

Figure 2:
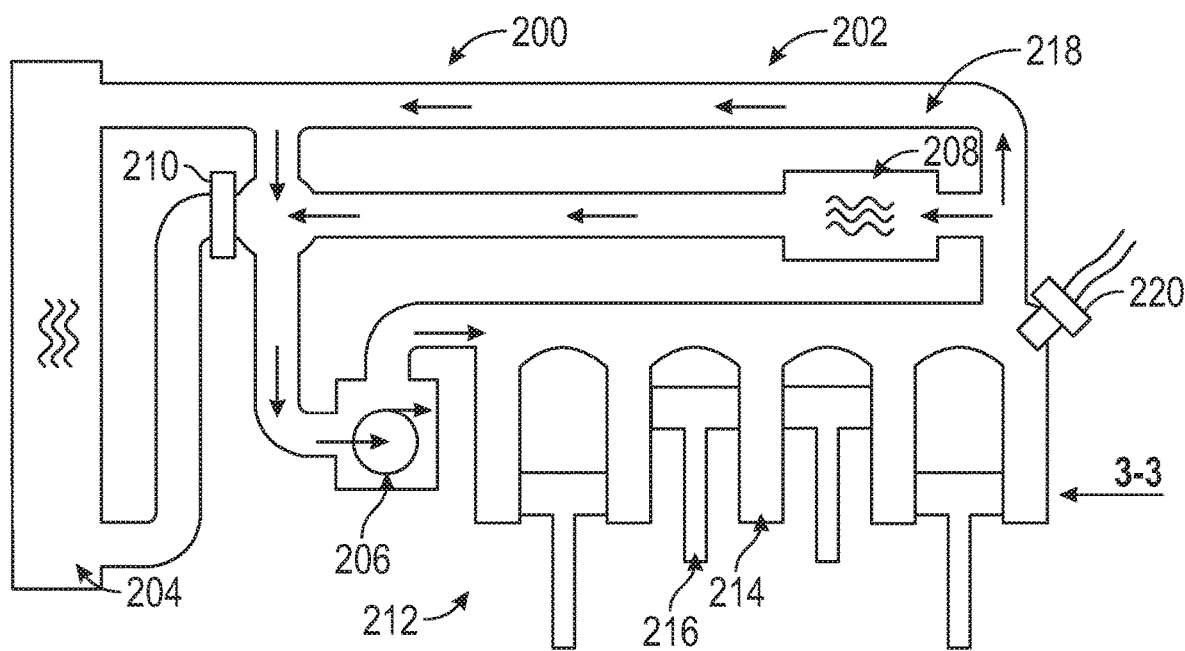
FIG. 2 is an illustration of a front view of an engine system in accordance with an example embodiment.

FIG. 2 is an illustration of a front view of an engine system in accordance with an example embodiment. Engine system 200 is an example of one implementation for engine system 102 in FIG. 1. As depicted, engine system 200 includes engine cooling system 202. Engine cooling system 202 is an example of one implementation for engine cooling system 104 in FIG. 1. Engine cooling system 202 includes radiator 204, water pump 206, heater core 208, thermostat 210, and cylinder system 212. Cylinder system 212 includes plurality of water jackets 214 and plurality of pistons 216.

Water pump 206 is used to circulate coolant 218 through engine system 200. Coolant 218, which is an example of one implementation for coolant 120 in FIG. 1, is water. Temperature sensor 220 is coupled to engine cooling system 202 and used to measure the temperature of coolant 218. Temperature sensor 220 is an example of one implementation for temperature sensor 112 in FIG. 1.

Figure 3:
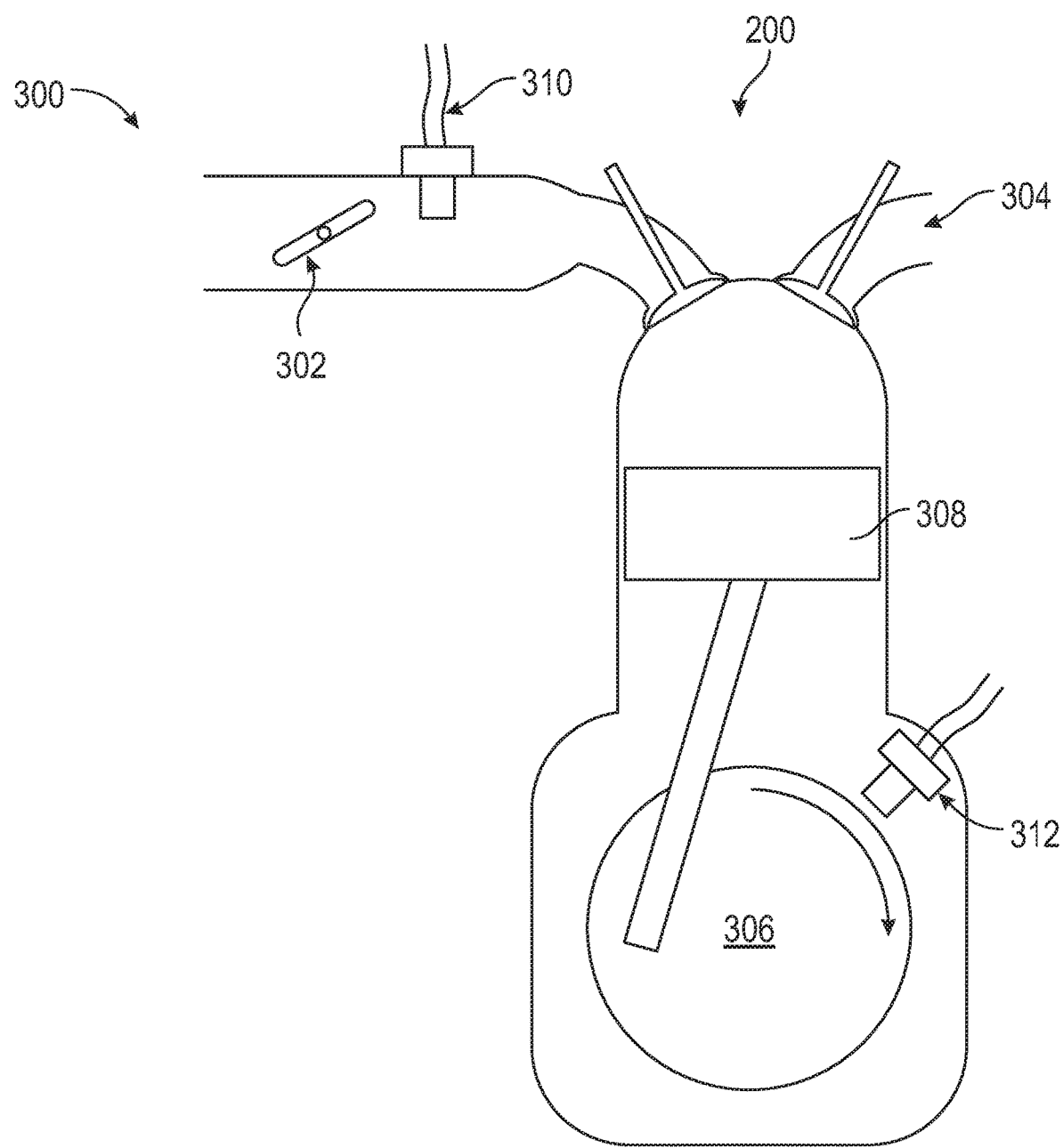
FIG. 3 is an illustration of a side view of engine system 200 from FIG. 2 in accordance with an example embodiment.

FIG. 3 is an illustration of a side view of engine system 200 from FIG. 2 taken from the view of arrow 3 in FIG. 2 in accordance with an example embodiment. Engine system 200 further includes air intake 300, throttle plate 302, exhaust 304, crankshaft 306, and piston 308. Air intake 300 is an example of one implementation for air intake 106 in FIG. 1. Crankshaft 306 is an example of one implementation for crankshaft 108 in FIG. 1. Piston 308 is an example of one of plurality of pistons 216 from FIG. 2.

Airflow sensor 310 is coupled to air intake 300. Airflow sensor 310 is an example of one implementation for airflow sensor 114 in FIG. 1. In this example, airflow sensor 310 measures at least one of an engine air amount or an air intake temperature for engine system 200. Speed sensor 312 is coupled to crankshaft 306. Speed sensor 312, which is an example of one implementation for speed sensor 116 in FIG. 1, is used to measure engine speed.

Figure 4:
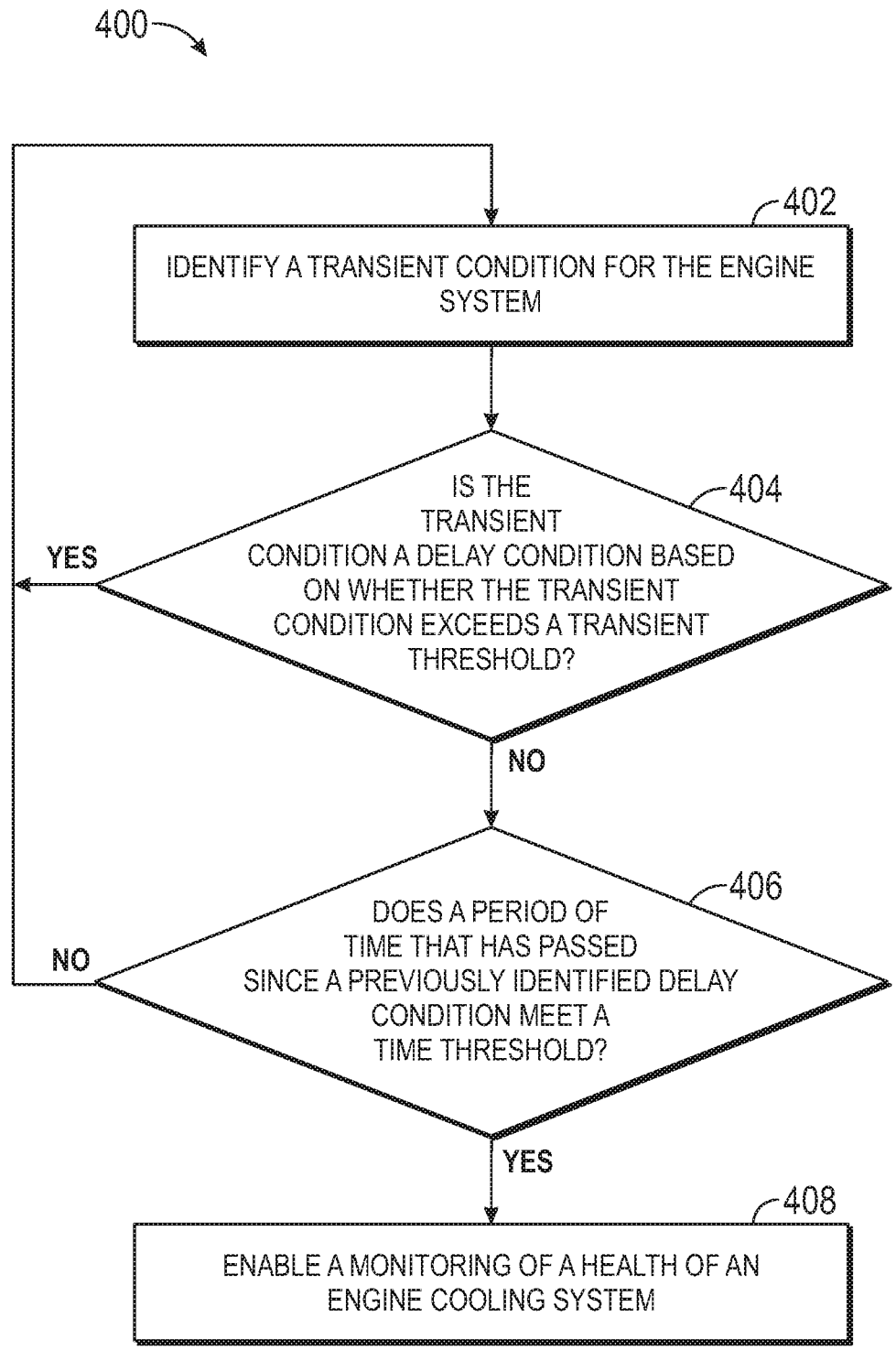
FIG. 4 is a flowchart of a method for managing a monitoring of an engine cooling system in accordance with an example embodiment.

FIG. 4 is a flowchart of a method 400 for managing a monitoring of an engine cooling system in accordance with an example embodiment. Method 400 is illustrated as a set of operations or steps 402 through 408 and is described with continuing reference to FIG. 1. Not all of the illustrated steps 402 through 408 may be performed in all embodiments of method 400. One or more steps that are not expressly illustrated in FIG. 4 may be included before, after, in between, or as part of the steps 402 through 408. In some embodiments, one or more of the steps 402 through 408 may be implemented, at least in part, in the form of executable code stored on non-transitory, tangible, machine-readable media that when run by one or more processors may cause the one or more processors to perform one or more of the processes. In one or more embodiments, the steps in method 400 are performed within a vehicle, such as vehicle 100 in FIG. 1, by a health manager 126, such as health manager 126 in FIG. 1.

Method 400 begins by identifying a transient condition of an engine system (402). Step 402 includes, for example, computing a value for the transient condition based on sensor data received from a sensor system, such as sensor system 110 in FIG. 1, coupled to the engine system. In one example, step 402 includes monitoring at least one of a coolant temperature of a coolant of the engine cooling system, an engine air amount, an air intake temperature, an engine speed, or some other type of factor.

As previously described with respect to transient condition 130 in FIG. 1, a transient condition associated with the engine system is the difference or deviation between a current condition of the engine system at a current point in time and a previous condition of the engine system at a previous point in time. The previous point in time may be at a predetermined time interval before the current point in time. In one or more example embodiments, this time interval may be fixed. For example, the predetermined time interval may be 1 second, 5 seconds, 30 seconds, 1 minute, 5 minutes, 10 minutes, 30 minutes, or some other interval of time.

Next, a determination is made as to whether the transient condition is a delay condition based on whether the transient condition exceeds a transient threshold (step 404). Step 404 may be performed by determining whether the transient condition exceeds a transient threshold, such as transient threshold 136 described in FIG. 1. In these examples, the transient threshold is a dynamic threshold. In other examples, step 404 may be performed based on whether the transient condition meets or exceeds the transient threshold.

If the transient condition is a delay condition, the process returns to step 402 described above. Otherwise, a determination is made as to whether a period of time that has passed since a previously identified delay condition meets a time threshold (step 406). In step 406, the time threshold is a dynamic threshold. If the period of time does not meet the time threshold, the process returns to step 402 described above. Otherwise, monitoring of a health of the engine cooling system is enabled (step 408).

Figure 5:
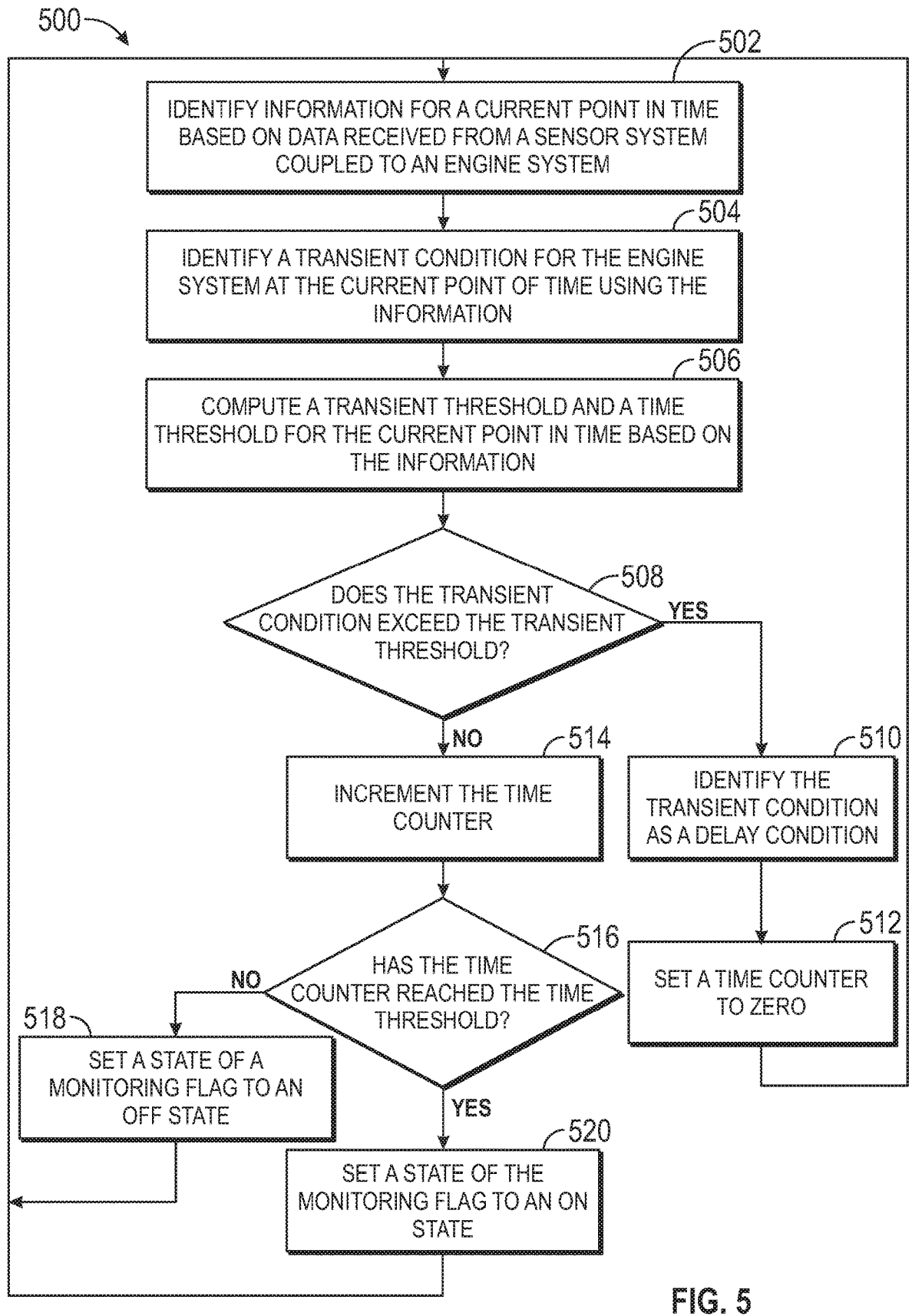
FIG. 5 is a flowchart of a method for managing a monitoring of an engine cooling system in accordance with an example embodiment.

FIG. 5 is a flowchart of a method 500 for managing a monitoring of an engine cooling system in accordance with an example embodiment. Method 500 is illustrated as a set of operations or steps 502 through 520 and is described with continuing reference to FIG. 1. Not all of the illustrated steps 502 through 520 may be performed in all embodiments of method 500. One or more steps that are not expressly illustrated in FIG. 5 may be included before, after, in between, or as part of the steps 502 through 520. In some embodiments, one or more of the steps 502 through 520 may be implemented, at least in part, in the form of executable code stored on non-transitory, tangible, machine-readable media that when run by one or more processors may cause the one or more processors to perform one or more of the processes.

In one or more embodiments, the steps in method 500 are performed within a vehicle, such as vehicle 100 in FIG. 1, by a health manager 126, such as health manager 126 in FIG. 1. Further, method 500 is an example of a more detailed process of the process described in method 400 in FIG. 4.

Method 500 begins by identifying information for a current point in time based on data received from a sensor system coupled to an engine system (step 502). In these examples, the information includes a coolant temperature. The information may optionally include at least one of an engine air amount, an air intake temperature, or an engine speed. In step 502, the data from the sensor system may include the coolant temperature, the engine air amount, the air intake temperature, the engine speed, or a combination thereof. In other examples, the data from the sensor system is used to compute the coolant temperature, the engine air amount, the air intake temperature, the engine speed, or a combination thereof.

Next, a transient condition for the engine system at the current point of time is identified using the information (step 504). A transient threshold and a time threshold are computed for the current point in time based on the information received from the sensor system (step 506). Each of the transient threshold and the time threshold may be computed using solely the coolant temperature or using the coolant temperature and at least one of the engine air amount, the air intake temperature, or the engine speed. The transient threshold computed in step 506 may include a positive threshold and a negative threshold.

A determination is made as to whether the transient condition exceeds the transient threshold (step 508). In step 508, when the event condition includes both a positive and a negative threshold, the transient condition exceeds the transient threshold when its value exceeds either the positive or the negative threshold. If the transient condition exceeds the transient threshold, the transient condition is identified as a delay condition (step 510). Thereafter, a time counter is set to zero (step 512), with the process then returning to step 502 as described above.

If the transient condition does not exceed the transient threshold, the time counter is incremented (step 514). A determination is then made as to whether the time counter has reached a time threshold (step 516). If the time counter has not reached the time threshold, a state of a monitoring flag is set to an off state (step 518), with the process then returning to step 502 described above. When the state of the monitoring flag prior to step 518 is already an off state, step 518 includes leaving the monitoring flag as is. When the state of the monitoring flag prior to step 518 is an on state, step 518 includes changing the on state to the off state.

The monitoring flag is a marker for indicating when monitoring of the engine cooling system is to be performed. For example, when the monitoring system is in the off state, monitoring of the health of the engine cooling system is not performed (i.e., delayed). When the monitoring system is in the on state, monitoring of the health of the engine cooling system is performed (i.e., enabled). Although a monitoring flag is described in steps 518 and 520, some other type of marker, indicator, variable, or state machine may be used to track when monitoring of the engine cooling system is to be enabled (e.g., activated) and when monitoring of the engine cooling system is to be disabled (e.g., delayed, paused, or deactivated).

Referring again to step 516, if the time counter has reached the time threshold, the state of the monitoring flag is set to the on state (step 520), with the process then returning to step 502 as described above. In this manner, monitoring is enabled at step 520.

Figure 6:
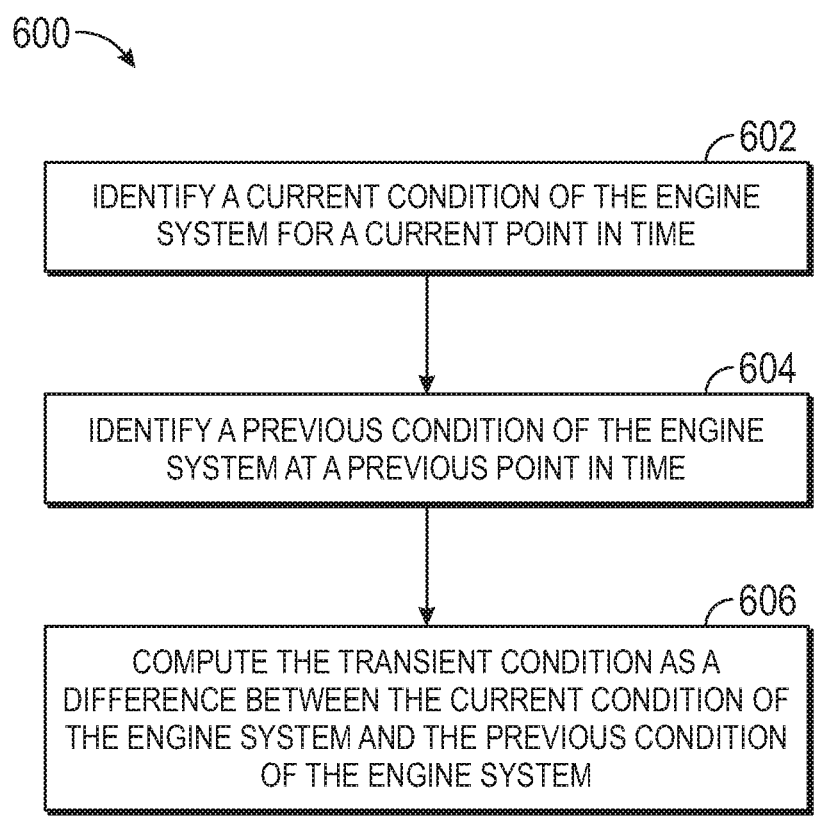
FIG. 6 is a flowchart of a method for identifying a transient condition for an engine system in accordance with an example embodiment.

FIG. 6 is a flowchart of a method 600 for identifying a transient condition for an engine system in accordance with an example embodiment. Method 600 is illustrated as a set of operations or steps 602 through 606 and is described with continuing reference to FIG. 1. Not all of the illustrated steps 602 through 606 may be performed in all embodiments of method 600. One or more steps that are not expressly illustrated in FIG. 6 may be included before, after, in between, or as part of the steps 602 through 606. In some embodiments, one or more of the steps 602 through 606 may be implemented, at least in part, in the form of executable code stored on non-transitory, tangible, machine-readable media that when run by one or more processors may cause the one or more processors to perform one or more of the processes. In one or more embodiments, the steps in method 600 are performed within a vehicle, such as vehicle 100 in FIG. 1, by a health manager 126, such as health manager 126 in FIG. 1. Further, method 600 is an example of one manner in which step 402 in FIG. 4 and step 504 in FIG. 5 may be implemented.

Method 600 may begin by identifying a current condition of the engine system for a current time (step 602). The current condition of the engine system may be, for example, a value that is computed based on sensor data. In one example embodiment, the current condition of the engine system may be a value computed based on at least one of coolant temperature, an engine air amount, an air intake temperature, an engine speed, or some other type of factor. In some cases, the current condition of the engine system is the current coolant temperature measured or otherwise detected for the coolant being circulated within the engine system via the engine cooling system.

In some examples, step 602 includes identifying a preliminary current condition for the engine system based on the sensor data and then modifying the preliminary current condition. The preliminary current condition may be modified using, for example, a set of modeling techniques to identify a current modeled condition for the engine system. Thus, the current condition identified in step 602 may be the current modeled condition for the engine system. The set of modeling techniques may include at least one of a filtering algorithm, a smoothing algorithm, or a delay algorithm. The set of modeling techniques is used to process the sensor data to compute a more accurate current condition of the engine system.

A previous condition of the engine system is identified at a previous point in time (step 604). In step 604, the previous point in time may be at a predetermined time interval before the current point in time. In some examples, the previous condition of the engine system is the previously modeled condition for the engine system generated for the previous point in time. Thereafter, the transient condition is computed as a difference between the current condition of the engine system and the previous condition of the engine system (step 606). The value for the transient condition may indicate a change from the previous condition to the current condition or no change from the previous condition to the current condition.

Thus, the example embodiments described above provide methods and systems for taking into account transient conditions such that monitoring of the health of the engine cooling system is prevented during and for at least a period of time after such transient conditions. In particular, when the difference between the current condition and the previous condition of the engine system is greater than a transient threshold, monitoring of the health of the engine cooling system is delayed. The example embodiments described above provide methods and systems to ensure that monitoring of the engine cooling system is performed when the health of the engine cooling system can be accurately determined. In particular, by controlling when the monitoring of the engine cooling system is performed based on the extent of the transient condition, modeling of the coolant temperature for the engine cooling system and thereby, monitoring of the health of the engine cooling system, may be more accurately performed.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. A method for managing a monitoring of an engine cooling system, the method comprising:
    identifying a transient condition associated with an engine system;
    determining whether the transient condition is a delay condition based on whether the transient condition exceeds a transient threshold;
    determining, in response to a determination that the transient condition is not the delay condition, whether a period of time that has passed since a previously identified delay condition meets a time threshold; and
    resuming modeling of an expected coolant temperature of the engine cooling system by a processor in response to a determination that the period of time meets the time threshold to thereby resume monitoring of a health of the engine cooling system.

2. The method of claim 1, further comprising:
    computing the transient threshold based on a coolant temperature for a coolant of the engine cooling system.

3. The method of claim 2, wherein computing the transient threshold comprises:
    computing the transient threshold based on both the coolant temperature and at least one of an engine air amount or an air intake temperature for the engine system.

4. The method of claim 2, wherein computing the transient threshold comprises:
    computing the transient threshold based on both the coolant temperature and an engine speed for a coolant of the engine cooling system.

5. The method of claim 2, wherein computing the transient threshold comprises:
    computing the transient threshold based on the coolant temperature, at least one of an engine air amount or an air intake temperature for the engine system, and an engine speed for a coolant of the engine cooling system.

6. The method of claim 1, further comprising:
    delaying the modeling of the expected coolant temperature to thereby delay monitoring of the health of the engine cooling system in response to either a determination that the period of time does not meet the time threshold or a determination that the transient condition is the delay condition.

7. The method of claim 1, wherein identifying the transient condition comprises:
    identifying a current condition of the engine system for a current point in time;
    identifying a previous condition of the engine system at a previous point in time; and
    computing the transient condition as a difference between the current condition of the engine system and the previous condition of the engine system.

8. The method of claim 7, wherein identifying the current condition of the engine system comprises:
    identifying a preliminary current condition for the engine system; and
    modifying the preliminary current condition using a set of modeling techniques to identify a current modeled condition for the engine system, wherein the set of modeling techniques includes at least one of a filtering algorithm, a smoothing algorithm, or a delay algorithm.

9. The method of claim 8, wherein identifying the previous condition of the engine system comprises:
    identifying a previously modeled condition for the engine system.

10. The method of claim 1, wherein the transient threshold includes a positive threshold and a negative threshold and wherein determining whether the transient condition is the delay condition comprises:

determining whether the transient threshold exceeds either the positive threshold or the negative threshold.

11. The method of claim 10, further comprising:

incrementing a time counter in response to a determination that the transient condition exceeds neither the positive threshold nor the negative threshold.

12. The method of claim 10, further comprising:

setting a time counter to zero in response to a determination that the transient threshold exceeds either the positive threshold or the negative threshold.

13. The method of claim 1, wherein resuming the modeling of the expected coolant temperature of the engine cooling system comprises:

setting a state of a monitoring flag to an on state in response to the determination that the period of time meets the time threshold, wherein the engine cooling system is monitored when the monitoring flag is in the on state.

14. The method of claim 13, further comprising:

setting the state of the monitoring flag to an off state in response to a determination that the period of time does not meet the time threshold, wherein the engine cooling system is not monitored when the monitoring flag is in the off state.

15. A system comprising:

an engine system including an engine cooling system;
a sensor system coupled to the engine system; and
a health manager in communication with the sensor system, wherein the health manager identifies a transient condition associated with the engine system based on sensor data received from the sensor system; determines whether the transient condition is a delay condition based on whether the transient condition exceeds a transient threshold; determines, in response to a determination that the transient condition is not the delay condition, whether a period of time that has passed since a previously identified delay condition meets a time threshold; and resumes modeling of an expected coolant temperature of the engine cooling system in response to a determination that the period of time meets the time threshold to thereby resume monitoring of a health of the engine cooling system.

16. The system of claim 15, wherein the sensor system includes at least one of a temperature sensor coupled to the engine cooling system, an airflow sensor coupled to an intake of the engine system, or a speed sensor coupled to a crankshaft of the engine system.

17. The system of claim 15, wherein the health manager dynamically computes the transient threshold for any given point in time based on the sensor data received from the sensor system.

18. The system of claim 15, wherein the health manager dynamically computes the time threshold for any given point in time based on the sensor data received from the sensor system.

19. The system of claim 15, wherein the health manager delays the monitoring of the health of the engine cooling system in response to a determination that the period of time does not meet the time threshold.

20. A method for managing a monitoring of an engine cooling system, the method comprising:

identifying a transient condition for an engine system for a current point in time;

computing a transient threshold and a time threshold for the current point in time;

determining whether the transient condition is a delay condition based on whether the transient condition exceeds the transient threshold;

determining, in response to a determination that the transient condition is not the delay condition, whether a period of time that has passed since a previously identified delay condition meets the time threshold;

resuming modeling of an expected coolant temperature of the engine cooling system by a processor in response to a determination that the period of time meets the time threshold to thereby resume monitoring of a health of the engine cooling system; and delaying the modeling of the expected coolant temperature of the engine cooling system to thereby delay the monitoring of the health of the engine cooling system in response to either a determination that the transient condition is the delay condition or a determination that the period of time does not meet the time threshold.

* * * * *